(12) United States Patent
Hanhikorpi et al.

(10) Patent No.: US 7,492,164 B2
(45) Date of Patent: Feb. 17, 2009

(54) METHOD FOR MANUFACTURING A PRODUCT SENSOR, AND A PRODUCT SENSOR

(75) Inventors: Marko Hanhikorpi, Pirkkala (FI); Samuli Strömberg, Tampere (FI)

(73) Assignee: UPM-Kymmene Corporation, Helsinki (FI)

( * ) Notice: Subject to any disclaimer, the term of this patent is extended or adjusted under 35 U.S.C. 154(b) by 491 days.

(21) Appl. No.: 11/121,274

(22) Filed: May 3, 2005

(65) Prior Publication Data

US 2005/0275533 A1    Dec. 15, 2005

Related U.S. Application Data

(63) Continuation of application No. PCT/FI03/00716, filed on Oct. 2, 2003.

(30) Foreign Application Priority Data

Nov. 4, 2002    (FI) .................................. 20021964

(51) Int. Cl.
*G01R 27/02* (2006.01)
*G01R 3/00* (2006.01)

(52) U.S. Cl. .................. 324/633; 324/600; 324/658; 340/539.26; 340/572.5; 340/870.16; 340/10.1; 29/595; 438/118; 235/492

(58) Field of Classification Search ............ 340/539.26, 340/539.27, 572.1, 572.5, 572.7, 870.16, 340/870.17, 10.1, 10.4; 324/600, 633, 658; 438/118; 29/592.1, 595
See application file for complete search history.

(56) References Cited

U.S. PATENT DOCUMENTS 3,651,405 A * 3/1972 Whitney et al. ........ 340/870.18
3,810,147 A    5/1974 Lichtblau
3,913,219 A    10/1975 Lichtblau
4,754,264 A    6/1988 Okada et al.
5,384,028 A * 1/1995 Ito .............................. 257/253
5,942,991 A * 8/1999 Gaudreau et al. ...... 340/870.16
6,294,997 B1 * 9/2001 Paratore et al. .......... 340/572.1

(Continued)

FOREIGN PATENT DOCUMENTS

FI    100138    1/1997

(Continued)

*Primary Examiner*—Jeff Hofsass
*Assistant Examiner*—Anne V Lai
(74) *Attorney, Agent, or Firm*—Fitch, Even, Tabin & Flannery

(57) ABSTRACT

The invention relates to a method for manufacturing a product sensor (2), and a product sensor (2). In the manufacturing method, a circuitry pattern is formed in the product sensor (2) for achieving an antenna circuit (L, C1, C2). In addition, the product sensor (2) is provided with at least one measuring means (13), whose at least one electrical property is affected by at least one condition. Product control is performed by measuring the at least one measuring means (13) formed in the product sensor (2), which means is affected by at least one condition, at least one electrical condition. In order to form a product sensor, at least a first (3) and a second module (5) are formed, the first of the modules (3) being provided with at least a part of said antenna circuit, and the second module (5) being provided with said at least one measuring means (13). Said at least two modules (3, 5) are connected to each other.

35 Claims, 4 Drawing Sheets

U.S. PATENT DOCUMENTS

Figure 1A:
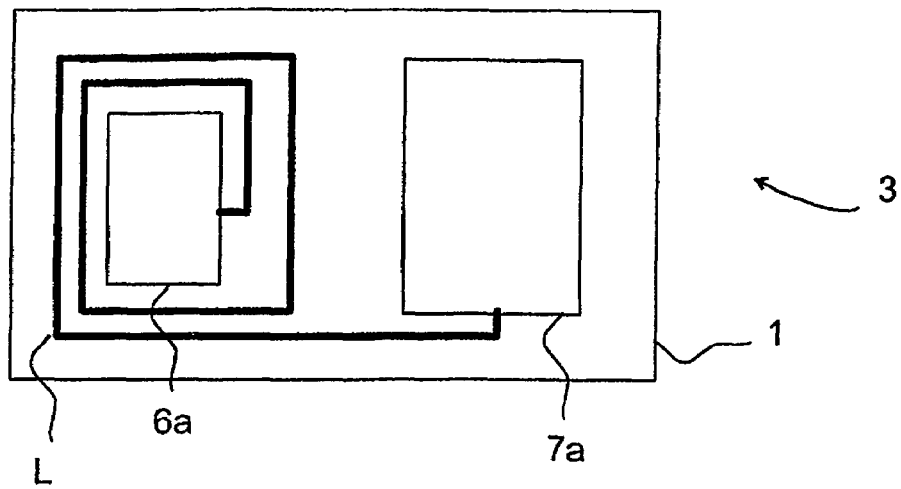

| | | | | |
|---|---|---|---|---|
| 6,563,417 B1 * | 5/2003 | Shaw | ........................ | 340/10.1 |
| 6,617,861 B1 * | 9/2003 | Joshi | ........................ | 324/637 |
| 6,639,402 B2 * | 10/2003 | Grimes et al. | ................ | 324/239 |
| 6,642,016 B1 * | 11/2003 | Sjoholm et al. | ............... | 435/15 |
| 6,774,800 B2 * | 8/2004 | Friedman et al. | ......... | 340/573.5 |
| 6,806,808 B1 * | 10/2004 | Watters et al. | ........... | 340/10.41 |
| 6,927,687 B2 * | 8/2005 | Carrender | .............. | 340/539.26 |
| 6,942,745 B2 * | 9/2005 | Segawa | ........................ | 156/60 |
| 7,015,826 B1 * | 3/2006 | Chan et al. | ............. | 340/870.17 |
| 7,034,677 B2 * | 4/2006 | Steinthal et al. | ........ | 340/539.12 |
| 7,071,830 B2 * | 7/2006 | Sahlberg et al. | .......... | 340/573.5 |
| 2002/0070868 A1 | 6/2002 | Jeutter et al. | | |
| 2007/0176773 A1* | 8/2007 | Smolander et al. | ..... | 340/539.26 |

FOREIGN PATENT DOCUMENTS

| | | | |
|---|---|---|---|
| GB | BG-2308947 A * | 7/1997 | |
| JP | 2001-134726 | 5/2001 | |
| JP | 2001134726 | 5/2001 | |
| JP | 2001-175827 | 6/2001 | |
| JP | 2001175827 | 6/2001 | |
| JP | 2001-357369 | 12/2001 | |
| JP | 2001357369 | 12/2001 | |
| JP | 2002119546 | 4/2002 | |
| WO | WO 97/04430 | 2/1997 | |
| WO | WO 99/33037 | 7/1999 | |
| WO | WO 00/79497 | 12/2000 | |
| WO | WO 02/099765 | 12/2002 | |
| WO | WO 03/050490 | 6/2003 | |

* cited by examiner

METHOD FOR MANUFACTURING A PRODUCT SENSOR, AND A PRODUCT SENSOR

This is a continuation of application number PCT/FI2003/000716, designating the U.S., filed Oct. 2, 2003, which claims priority to Finnish Application No. 20021964 filed Nov. 4, 2002, which are hereby incorporated herein by reference in their entirety.

The present invention relates to a method for manufacturing a product sensor to be used in product control, which product sensor is provided with an antenna circuit, and the product control is performed by measuring at least one measuring means formed in the product sensor, at least one electric property of the measuring means being affected by at least one condition. The invention also relates to a product sensor, which comprises an antenna circuit formed at least partly by circuitry patterns, and at least one measuring means, whose at least one electric property is affected by at least one condition.

In the following, some of the terms to be used in this application will be specified. In this application, a passive product sensor refers to such a product sensor, which is not provided with an integrated circuit (chip), a memory, nor a power source of its own. The passive product sensor mainly comprises RLC-circuits, i.e. resistive, inductive and/or capacitive components. A semi-active product sensor refers to such a product sensor, which comprises at least one integrated chip, and the product sensor can also be provided with a memory, which is placed in the integrated chip. However, the semi-active product sensor does not comprise a power source of its own. An active product sensor further refers to such a product sensor, which comprises both an integrated circuit and a power source. In addition, the active product sensor can be provided with a memory of its own.

Especially in order to keep the quality of food products as good as possible throughout the entire food product distribution chain from the producer to the consumer, proper conditions should be taken care of over the entire processing chain. The more perishable food products are concerned, the more important this is. For example, in the case of food products requiring refrigerated transport and cold storage, it is important that the temperature does not even momentarily rise above what is allowed. If, in some processing step, the temperature rises too high, the preservability of food products requiring cold processing is decreased, and in some cases detrimental substances may begin to form in food products, such as fish products.

In addition to the temperature, other conditions may also affect the preservability of food products. These conditions include, for example, the external conditions of the products and the product package (ambient conditions), such as temperature, air pressure, and also the conditions inside the product package, such as moisture, gas content (protective atmosphere, air), etc. For example, exposure to light may decrease the preservability of some food products, in which case such products should be stored well-protected from light. Moisture or oxygen can also have a preservability-decreasing effect on some food products. In some food products, some chemical begins to form when the product starts to perish. For example, hydrogen sulphide forms in perishing poultry products.

Food products are usually packed in packages for transport, storage and sales. The package typically includes instructions on what kind of conditions are required to keep the preservability of the food product in question suitable. In addition, there is often a mention of the sell-by date, the use-by date and/or the best before date in the food product package. On the basis of these dates it is possible to determine whether the food product in question is still usable. However, these dates are marked with the supposition that the food product is handled appropriately. If the conditions during the transport, storage and/or sales of the product do not always meet the requirements, the food product may be unfit for use already before the date marked on the food product packing. The buyer of the food product usually cannot conclude on the basis of the package whether the food product in question has been handled appropriately. Thus, the buyer may think he/she is buying a good product even though the requirements have not been met during the handling. A food product may turn out to be spoiled or to have a decreased preservability when the package is opened or first when the food product is used for preparing food.

In the distribution chain of food products it is possible to control, for example, the temperature of the refrigerated transport space or the sales space. However, there is typically only one measurement point in each space, and therefore the temperature may, to some extent, be different at different points of the space. Thus, some of the food products may be at too warm a temperature, even though the measured temperature is acceptable.

Different sensors are known, by means of which it is, at least in some cases, possible to find out afterwards whether the product has been handled appropriately. Such sensors may be based on, for example, the idea that some electric property of the sensor is dependent on the controlled condition. Thus, on the basis of changes in the sensor's electric property in question, the product is concluded to have changed or been exposed to some product changing condition or to a change of condition, such as moisture. Such measurement sensors based on the change in the electric property can be manufactured for different conditions, and the operation mechanisms of different measurement sensors can be different.

It is known that in connection with products it is possible to arrange indicators for temperature, moisture and freshness, as well as different leak indicators for controlling different leaks. These indicators can be irreversible, cumulative or reversible. With the irreversible indicators it is typically possible to indicate the maximum value of the controlled variable, such as the maximum moisture level. The cumulative indicators are used to measure, for example, the accumulation of the measured variable to which the product has been exposed during the product processing chain, for example the quantity of visible light, infrared radiation or ultraviolet radiation. With the reversible indicators it is possible to store information on the product processing chain for later examination in such a manner that the condition history of the controlled variable becomes clear.

So-called RFID tags or the like are also known, which tags can be used in connection with product control. Active RFID sensors are also known, in which case these sensors may comprise, for example, stored history information on the controlled variable, for example, temperature, moisture, etc.

A problem with the above-described passive indicators according to prior art is that they cannot be read electrically at all, or reading them requires either a visual connection or an electric contact between the indicator and the scanner. The transmitter arrangements used in the active sensors are expensive and complex, so therefore the use of this type of sensors, especially in serial production, is not economical nor necessarily technically possible.

When using the above-described product sensor, it is possible to detect condition changes which may affect the preservability of the product, especially in the case of a food product. Thus, for example, when buying the product it is possible to check that the product has been handled properly. If the product sensor is package-specific, it is also possible to detect such situations, wherein a majority of products in the same consignment are in appropriate condition, but some of the products are, for example, at too warm a temperature or exposed to light.

The purpose of the present invention is to provide a product sensor, with which it is possible to control the conditions in a product package, and a method for manufacturing such a product sensor. The invention is based on the idea that the product sensor is formed of at least two modules which are connected to each other. At least a part of an antenna circuit is formed in one module, and a measuring means, which reacts to the condition, is formed in the other module. The modules are connected to each other advantageously by means of a thermoplastic film or, for example, with an isotropic or anisotropic paste. The module which comprises the measuring means reacting to the condition may also comprise a part of an electric resonance circuit. The information of the product sensor can be read with a scanner suitable for this purpose. To put it more precisely, the manufacturing method according to the present invention is primarily characterized in that in order to form a product sensor, at least a first and a second module are formed, the first module being provided with at least a part of said antenna circuit, and the second module being provided with at least said at least one measuring means, and that said at least two modules are connected to each other. The product sensor according to the invention is primarily characterized in that the measuring means comprises at least a first and a second module, that the first module is provided with at least a part of said antenna circuit, and the second module is provided with at least a measuring means, and that said at least two modules are connected to each other.

The present invention shows remarkable advantages over solutions according to prior art. By the module structure according to the invention, easy variability can be achieved in the manufacture of the product sensor, because different modules can be combined with each other to achieve, as the final result, a product sensor, which corresponds, as well as possible, to the properties desired at the time. Thanks to the module structure, different substrate materials can be used in the manufacture of the coil and in the manufacture of the measuring means.

The method according the invention can be automated easily and at low costs. Another advantage of the method according to the invention is that the extra material costs are relatively low. The module structure makes it possible that it is not necessary to use, for example the same conductor material throughout the product sensor, but different conductor and other materials can be used in different modules. Thus, it is possible to use even more expensive materials, such as silver, in the product sensor, for example, in one module. Thus, the manufacturing costs of the finished product sensor are decreased and the quality is improved in comparison to product sensors according to prior art and their manufacturing methods.

Different types of manufacturing methods can be used in manufacturing different modules. Thus, the manufacture of modules comprising measuring means, which requires accuracy and is expensive, can be performed as a process of its own, and the modules suitable for a bulk production can be manufactured as a separate, more economical process.

With the method according to an advantageous embodiment of the invention, the product sensors can be manufactured fast and at relatively low junction temperatures. Thanks to the low junction temperatures, it is possible to use materials with a lower thermal stability, which may often have, for example, better dielectric properties than materials with a higher thermal stability. In some applications, the modules can be joined together in a contactless manner, wherein junction resistances are avoided. Also when a contact coupling is used, lower joint resistances than in prior art and good joint reliability are achieved.

In the manufacture of the product sensor according to the invention, it is also possible to use various measuring means manufacturing techniques, including the use of selective resists, pattern vaporization, printing with conductive pastes, the use of resists exposed on a film and/or the use of separate measuring means.

In the method according to an advantageous embodiment of the invention, the required junction tolerances are not as strict as in the methods of prior art, in which case the yield becomes better. Also, the amount of material required in the manufacture is small in comparison to the manufacture of product sensors according to prior art.

In the manufacture of the product sensor according to the invention, it is possible to use dielectrics, which can be printed, laminated and/or coated (e.g. extrusion coating).

Figure 1B:
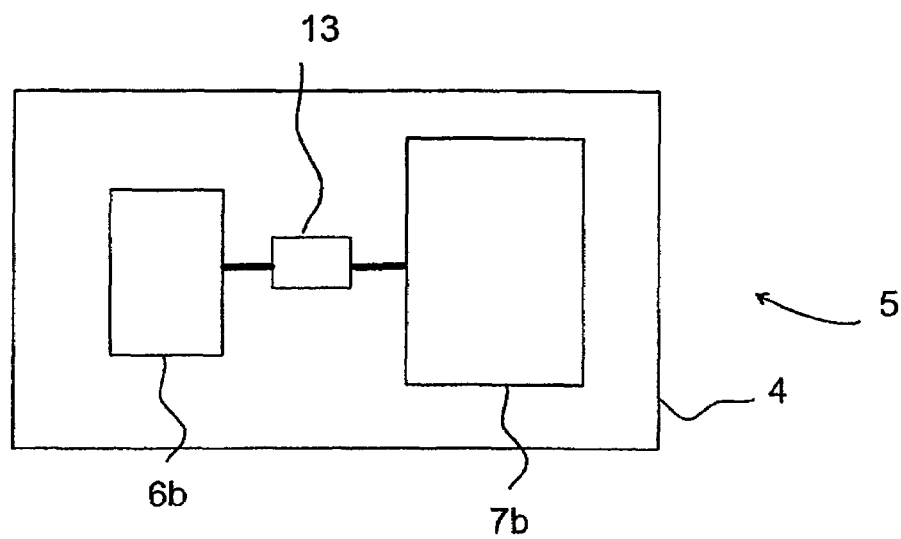
Figure 2A:
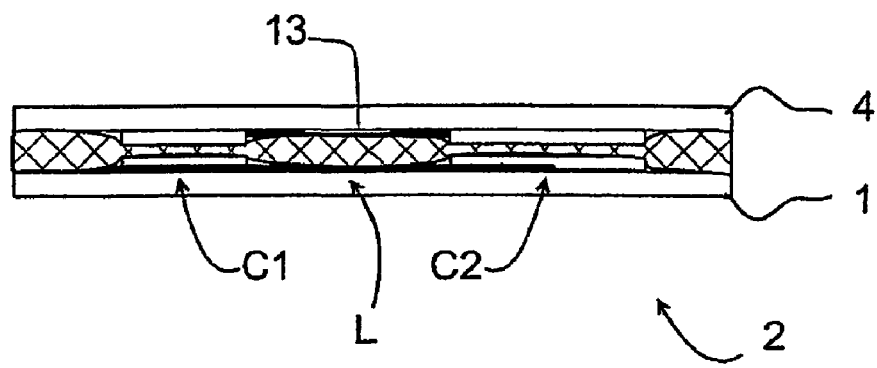
Figure 2B:
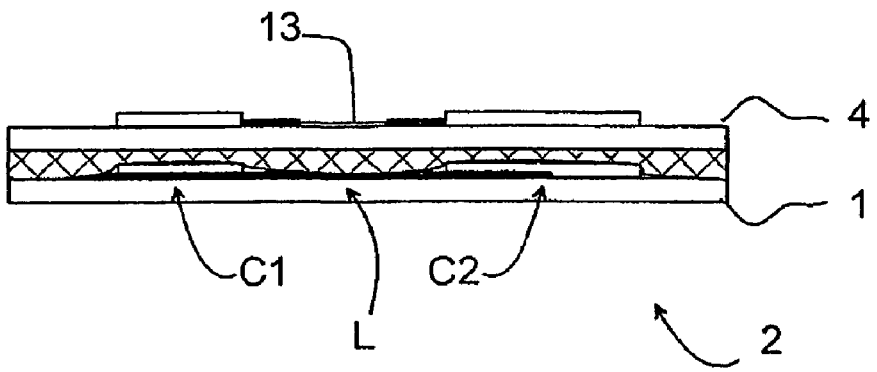
Figure 3:
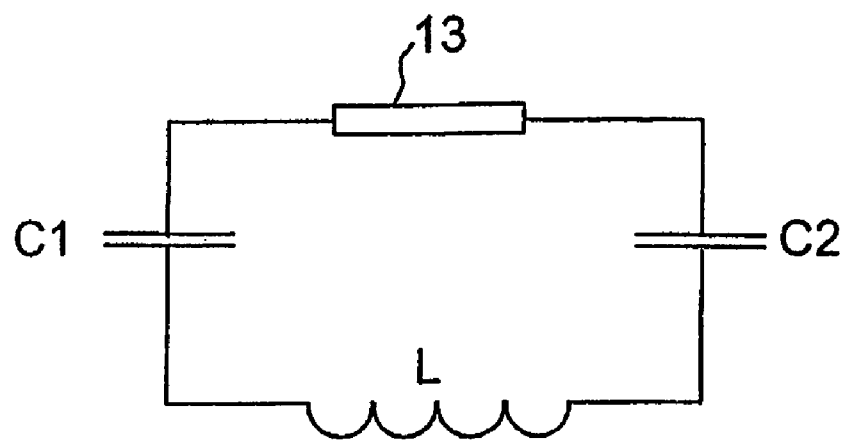
Figure 4:
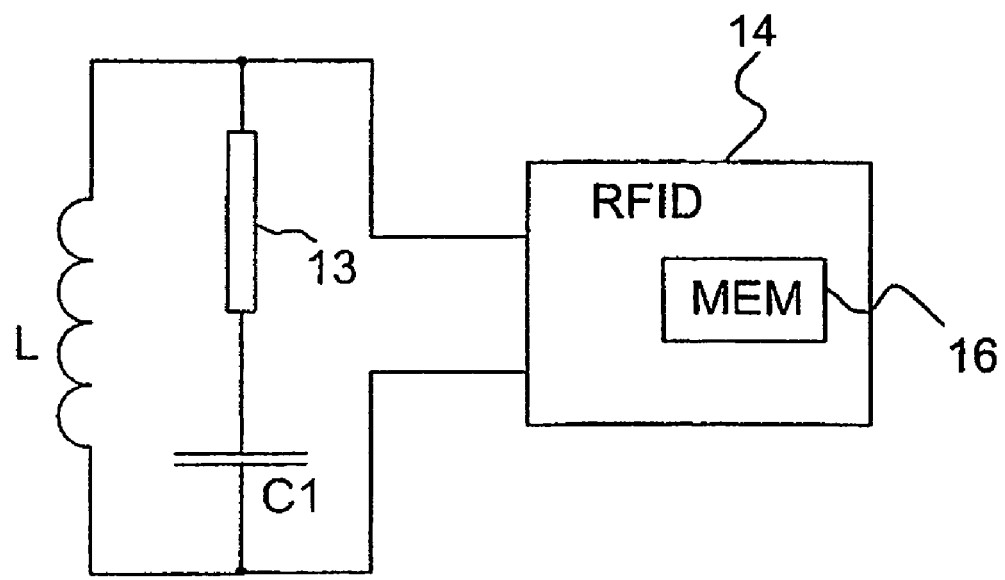
Figure 5:
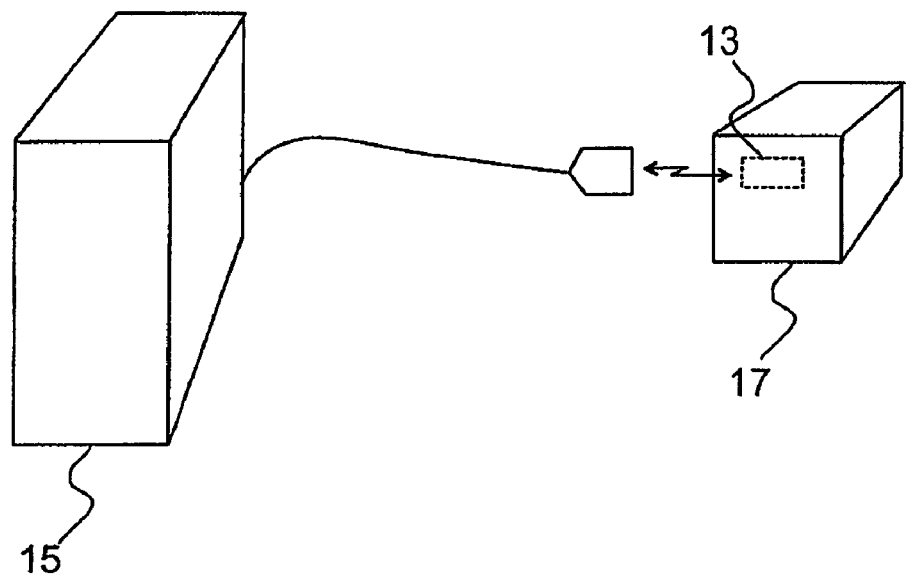
Figure 6:
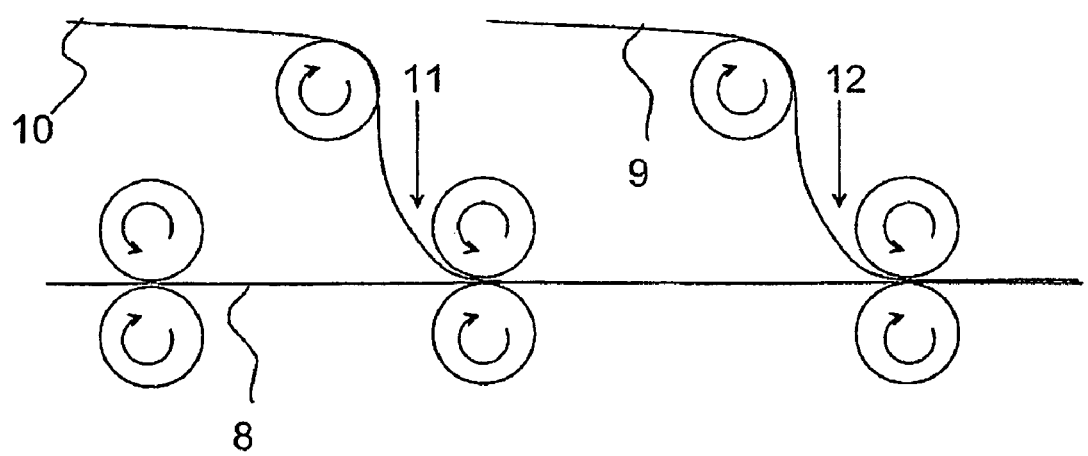

In the following, the invention will be described in more detail with reference to the appended drawings, in which FIG. 1a shows the first module of a product sensor according to an advantageous embodiment of the invention, seen in a top view, FIG. 1b shows the second module of a product sensor according to an advantageous embodiment of the invention, seen in a top view, FIG. 2a shows the modules of FIGS. 1a and 1b connected to each other, seen in a side view, FIG. 2b shows the modules of a product sensor according to another advantageous embodiment of the invention connected to each other, seen in a side view, FIG. 3 shows the electric equivalent coupling in a product sensor according to an advantageous embodiment of the invention, FIG. 4 shows the electric equivalent coupling in a product sensor according to another advantageous embodiment of the invention, FIG. 5 shows an example situation of the processing of a product sensor according to another advantageous embodiment of the invention, and FIG. 6 shows the step of combining the modules in the method according to an advantageous embodiment of the invention.

FIG. 3 shows the electric equivalent coupling in a product sensor 2 according to an advantageous embodiment of the invention. The antenna circuit of the product sensor 2 according to this embodiment comprises a resonance circuit, which consists of a coil L and two capacitors C1, C2. It is, however, obvious that there can be more than one coils, and the number of capacitors may be other than two. In addition, a part of the resonance circuit consists of a measuring means 13, whose some electric property is proportional to one or more conditions, such as temperature, moisture, visible light, UV radiation, infrared radiation, radioactive radiation, oxygen, or the like. The condition that the measuring means 13 is desired to react to has an effect on, e.g. the material which the measuring means 13 is to be made of. The response sensitivity can be affected by changing some parameter of the measuring means 13. In some cases, for example, changing the cross-sectional area and/or length of the measuring means can affect the response sensitivity. On the other hand, in some measuring means 13, changing the material composition of the measuring means may have an effect on the response sensitivity. It is also possible to manufacture the product sensor according to the invention to be such, where the resistive, capacitive and/or dielectric property of the intermediate layer of the modules changes when the condition to be detected changes.

The base frequency of the resonance circuit of the product sensor 2 according to this advantageous embodiment of the invention is achieved by means of the coil L and the capacitors C1, C2. It is, however, obvious that also the measuring means 13 affects this base frequency to some extent. The coil L and the capacitors C1, C2, which are not a part of the measuring means 13, are aimed to be implemented in such a manner that their electric values are as independent as possible of the condition changes in order for them not to affect the measuring results.

It is, however, obvious that the antenna circuit can also be formed solely of an antenna, such as a dipole antenna. Even then one or more conductors of the antenna are formed in the first module 3. In some applications the antenna is formed as the coil L without a separate antenna conductor being formed in the antenna circuit. The capacitor C1, C2 is also not required in all applications.

However, the invention can also be applied in such a manner that the measurement is based at least partly on a change in capacitance or inductance. Thus a capacitor or a coil, correspondingly, is used as the measurement means 13. The capacitor part reacting to the condition can be either in the second module 5 or in the intermediate layer between the modules.

If the capacitor C1, C2 is used as the measuring means 13, the capacitor is advantageously manufactured in such a manner that the capacitance of the capacitor changes when the condition to be detected changes. This can be achieved, for example, by manufacturing the insulating layer between the capacitor sheets of such a material whose dielectricity changes when the condition changes. In this type of a solution, a layer between two superimposed modules 3, 5 or an insulating layer formed between two capacitor sheets formed in the second module advantageously operates as the insulating layer. Correspondingly, the measuring means based on the measurement of inductivity comprises a coil formed on a base. The base material is advantageously selected to be such that its permeability depends on the condition to be measured.

If a capacitor is used as the measuring means 13, it can also be implemented by applying the module structure according to the invention advantageously in such a manner that one of the capacitor sheets is manufactured of a more reactive material in order to improve the measurement sensitivity. This more reactive material may be more expensive than the material used in manufacturing the second capacitor sheet.

The following is a description on the use of the product sensor 2 in controlling product conditions according to the above-described embodiment of the invention. The base frequency of the product sensor 2 is measured by setting the product sensor in a state corresponding to such conditions which preferably correspond to the conditions suitable for the product being controlled. On the other hand, the measurement step is typically not necessary after a measurement has been performed for one product sensor 2, on the basis of which measurement the properties of the product sensor 2 manufactured with the design parameters in question and how they change when conditions change are known. Furthermore, if, for example, on the basis of test measurements it is known how the properties of the product sensor 2 change when some design parameter changes, the properties of the product sensor 2 can be determined on the basis of these design parameters and, on the other hand, the design parameters can be changed in order to achieve the desired characteristic curve.

The characteristic curve of the product sensor advantageously indicates the changes in the resonance frequency of the product sensor in relation to the change in the monitored condition. Thus, to perform product control, the resonance frequency of the product sensor 2 arranged in connection with the product, advantageously attached to the product package, is advantageously measured. This measured resonance frequency is compared to the characteristic curve of the product sensor 2 in question, in which case it is determined whether the conditions are appropriate for the product to be monitored. If the conditions differ from the target condition, it is possible to estimate, on the basis of the extent of this deviation, what effect it has on the preservability or other properties of the product. If the deviation is such that the product has probably become unfit for use, the product can be removed from the monitored space, such as a storage room, transport space or a shop, and be marked as unusable. In some cases the condition deviation is such that the product is not necessarily unusable, but the preservability of the product has decreased. Thus the markings on the product package can be, for example, changed in such a manner that the likely shelf life of the product becomes clear from the product package. The buyer, seller, supplier of the product, or some other person can, on the basis of this marking, find out that the conditions have not completely corresponded to the ones intended for the product, and the person in question can thus in an easier manner estimate what should be done with the product. For example, the buyer can estimate whether the product in question should be purchased or not. The scanner can be, for example, at the cash desk and/or some other place in the shop. When controlling the product path from manufacture to sales, it is possible to use a scanning system, which may include more than one scanner. Scanners can thus be located at the manufacturer, at the transport company, for example, in their transport vehicles, in storage rooms, etc.

In some cases, the presence of a substance, such as hydrogen sulphide, in the product or within the product package is measured. If this type of a substance is detected, the product is likely to have perished. The measurement of this type of a substance is performed with a measuring means 13, which reacts to the presence of this type of a substance. In this type of situations the amount of the substance is usually not important, but its presence even in small measurable amounts is enough to detect perishing.

In practice, product control cannot be performed continuously, in which case a momentary deviation in conditions may be left undetected, if the change in the measuring means 13 is not permanent. With the resonance frequency measuring it is possible to detect even short deviations if the reaction of the measurement means 13 to changes in the conditions is irreversible. Irreversible reaction here refers to that even a short deviation in the monitored conditions causes a permanent change in the electric properties of the measuring means 13.

For product control, it is possible to arrange a measuring device (not shown) in connection with, for example, a refrigerated basin in a shop, by means of which the buyer can check that the product has been handled appropriately throughout the processing chain.

The variables measured with the product sensor according to the invention include, for example, the presence of hydrogen sulphide, humidity, oxygen, temperature, quantity of light, pressure, acceleration. However, it is obvious that in addition to the above variables also other variables can be measured with the product sensor 2 according to the invention.

The electrical equivalent coupling of the product sensor 2 according to another advantageous embodiment of the invention is shown in the appended FIG. 4. The difference in this embodiment in comparison to the embodiment of FIG. 3 is mostly that the product sensor 2 comprises an active means 14, such as an RFID circuit (Radio Frequency ID), wherein there is, for example, a memory 16 (MEM) for storing information. Therefore, it is a semi-active product sensor specified earlier in this description. In this embodiment, separate capacitors C1, C2 are not necessarily needed if a capacitor is integrated in the active means 14. The operating voltage required in the operation of the active means 14 is directed as electromagnetic energy to the product sensor via coil L. This is achieved in such a manner that a resonance frequency signal of the resonance circuit of the product sensor 2, arranged substantially in connection with the product, preferably in the product package 17 is generated with a handling device 15 for the product sensor (FIG. 5). In order to generate the signal, the handling device 15 measures the resonance frequency of the product sensor, if necessary. It is possible to modulate, or in some other manner encode information on the measured resonance frequency in the signal. This signal is received with the coil of the product sensor and directed to the active means 14 of the product signal. In the active means there are means (not shown) to rectify this signal and to form an operating voltage. Thus, as a response, the active means 14 forms a signal, which contains information stored in the active means 14, such as the code identifying the product sensor and the previously saved measuring result. If the encoding of the measured resonance frequency to the signal to be sent to the product sensor 2 was performed in the handling device 15, the signal demodulation is advantageously performed in the active means, as well as the storage of the information in the memory 16 of the active means 14.

In the handling device 15 it is possible to compare a previous measuring result with the present measuring result, in which case even small changes in the resonance frequency can be detected. Product information, such as the product sensor code and the measuring result, can be stored in the handling device 15 as well, and this information can be used in analysing the conditions to which the product has been exposed. In addition, it is in some cases possible to store information on the characteristic curve of the measuring means 13 in the memory 16 of the active means, in which case a change in the measured condition can be concluded by comparing the measuring result to the characteristic curve information.

By applying the method according to the invention, it is also possible to manufacture such active product sensors 2, wherein one module comprises, e.g. an antenna circuit for implementing data transfer between the product sensor 2 and the handling device 15, and another module comprises, e.g. a power source for supplying the voltage and power required in the operation of the product sensor 2 to the electric circuit of the product sensor 2.

Even though it has been described above that the changes in the conditions are controlled by means of changes in the resonance frequency, it is obvious that also some other property, which can be measured from the point of view of the electric operation of the product sensor 2, can be controlled. An example of such a property to be mentioned is the quality value Q of the coil L and/or the resonance circuit.

The product sensor can also be manufactured in such a manner that in the normal state the measuring means 13 causes a short circuit in the resonance circuit. Thus, the product sensor 2 is not detected with the scanner. However, in situations where the condition changes enough, the measuring means 13 reacts to this in such a manner that the impedance increases. Thus, the short circuit disappears and the resonance circuit starts to operate. Thus, the product sensor 2 is detected with the scanner and the measured condition can be found to have changed.

The measuring means 13 can in some applications also function in such a manner that in a normal situation the impedance of the measuring means is so high that there is no short circuit. In the situation when the measured condition reaches the reaction value, it causes a short circuit in the resonance circuit. Thus, the scanner does not detect the product sensor 2, which in this situation causes the deviant situation to be notified to the operator with some appropriate method.

The manufacture of the measuring means 13 of the product sensor 2 used in connection with the present invention can, because of the module structure, be performed separately from the manufacture of the resonance circuit. The module structure also makes it possible to measure different conditions according to what is necessary, by combining different measuring means 13 to a resonance circuit. In some cases there may be a need to use more than one product sensor 2 in connection with the same product, if more than one condition is to be monitored. On the other hand, in some cases it is enough that the measuring means 13 reacts to, e.g. several different substances, and that the presence of any such substance will be sufficient to indicate that the product has perished. In this type of a situation, it is possible to use such a measuring means 13, which reacts to two or more different substances, or several measuring means 13 are connected to the same resonance circuit, each one of which indicates the presence of at least one substance. When using several measuring means, they can be coupled either in series or in parallel, according to the situation.

Non-restrictive examples of the materials used in measuring means 13 to be mentioned in this context are silver and iron. Silver reacts, e.g. with hydrogen sulphite by forming a poorly conductive silver sulphide, in which case by measuring the Q value of the resonance circuit it is possible to conclude whether the measuring means 13 has been exposed to hydrogen sulphite. Correspondingly, iron oxidates when reacting with oxygen under humid ambient conditions, in which case the conductor resistance increases. In this case, by measuring the Q value it is possible to conclude the presence of oxygen and moisture in the product. In order for the product sensor 2 to measure the presence of both hydrogen sulphide and oxygen with moisture, the measuring means manufactured of silver and the measuring means manufactured of iron can be connected, e.g. in series with the resonance circuit of the product sensor 2. Thus, the change in the conductivity of either measuring means can be detected.

The following is a description of the method for manufacturing a module structure product sensor according to an advantageous embodiment of the invention, wherein the first module 3 of a product sensor 2 according to the invention is manufactured on a first substrate 1, such as a label laminate. FIG. 1a shows the first module 3 of the product sensor 2 according to an advantageous embodiment of the invention, seen in a top view. In a corresponding manner, the second module 5 of the product sensor 2 according to the invention is manufactured on a second substrate 4. FIG. 1b shows the second module 5 of the product sensor 2 according to one embodiment of the invention, seen in a top view. In this context, it should be mentioned that, for the sake of clarity, the appended FIGS. 1a to 4 do not necessarily have correct dimensions. The substrate materials to be used in the first 3 and the second module 5 are preferably flexible, in which case the finished product sensors 2 can be, for example, wound on a roll and they can be used in connection with a large variety of products.

Although, in the following description, the manufacturing method according to the invention will be described primarily in view of the manufacture of a single product sensor 2, it is obvious that the method of the invention can be used to manufacture several product sensors 2 simultaneously.

The manufacture of the first module 3 is advantageously started by depositing a first plating layer on the first substrate 1 by evaporation or by another suitable method. For example copper or aluminium are used in the evaporation of this first plating layer, and the thickness of evaporation is typically in the order of 100 to 500 nm. In the next step, the first plating layer is provided with the printing of a so-called electrolytic resist, for example by gravure printing. This electrolytic resist has such a pattern that an electrolytic resist is applied at those points in the first module 3 in which no conductive agent should be left, such as a conductor, a coil or a capacitor plate.

After this, the depositing of the conductors can be preferably performed by electrolysis. At this stage, in those parts of the plating layer, which do not contain the electrolytic resist, a second plating layer is formed by electrolysis. After this, the desired conductive pattern is formed onto the first plating layer of the product sensor, although still short-circuited by the first plating layer at this stage.

After the depositing stage, the electrolytic resist and the superfluous part of the first plating layer under the electrolytic resist remain to be removed. The electrolytic resist can be removed for example with lye. The use of lye for removing the electrolytic resist is advantageous when aluminium has been used at the stage of evaporation. However, if copper has been used as the evaporating substance, the removal, or etching, of the evaporated plating at the electrolytic resist can be performed in a separate bath in a way known as such. After the removal of superfluous metal, the first module 3 is ready for use as a component for the product sensor 2. In the example of FIG. 1*a*, this first module 3 is provided with a coil L, one plate 6*a*, 6*b* for two capacitors C1, C2, as well as the necessary wirings to couple the coil L and the capacitor plates 6*a*, 6*b* to each other.

In some applications, wirings and/or other electrical couplings can also be formed on the other side of this first substrate 1. These can be formed either in a two-layer process in connection with the above-presented steps, or in a separate step. When applying the two-layer structure, for example, the capacitor can be implemented in connection with this first substrate 1, in which case the substrate operates as an insulator.

It is obvious that the coil can, in a manner known as such, be implemented also by printing or by etching.

The second module 5 can be manufactured, for example, by using a subtractive manufacturing method, such as the etching technique. This second module 5 is provided with at least one measuring means 13. To achieve this, the surface of the substrate material is provided with a plating layer, for example of silver, copper, iron or aluminium, and to it the second plates 7*a*, 7*b* for capacitors C1, C2, as well as the required wiring, for example, in the same way as described above in connection with the manufacture of the plating layer of the first module 3. A mask has been added on the surface of this plating layer at the location in which the contacts of the measuring means 13 are to be implemented. In some applications, it is also possible to use more than one measuring means, in which case a mask is formed in a corresponding manner at those contacts of the measuring means where these measuring means are desired to be formed. The contacts are used in the electric coupling of the measuring means 13 to the first module 3.

The mask is made of a material that withstands the effect of the substance removing the electrolytic resist, wherein the part of the first plating layer at the mask is not decomposed.

If necessary, the measuring means mask can still be removed from the second module 5 in such a way that the rest of the electric couplings of the second module 5 are not affected to a significant extent. The measuring means can be formed on the surface of the second module 5, for example, by pressing the desired substance between the contacts. In this example, the second module 5 comprises a measuring means 13, second plates 7*a*, 7*b* of the capacitors C1, C2, as well as the necessary wirings to couple the measuring means 13 and the capacitor plates to each other in an expedient manner.

In the following, the step of combining the modules in the method of manufacturing a product sensor 2 according to an advantageous embodiment of the invention will be described. In this module-combining step, the purpose is to combine the first 3 and the second module 5 to produce a finished product sensor 2. In this context, reference is made to FIG. 6, which shows this module combination step in a reduced manner. Let us assume that the first 3 and second modules 5 are manufactured as a long (continuous) web, wherein said web comprises modules 3, 5 one after another and/or next to each other. In FIG. 6, the first web 8 comprises first modules 3 and, correspondingly, the second web 9 comprises second modules 5. For example, a thermoplastic film 10, which is also fed preferably as a separate web, is placed onto the surface of the first web 8. The attachment can be made by a method known as such, for example by transfer lamination or extrusion. This step is represented by arrow 11 in FIG. 5. Next, the second web 9 is placed onto the thermoplastic film 10 (arrow 12). Consequently, in this step, the second web 9 is attached by means of the thermoplastic film 10 onto the surface of the first web 8, in which case the desired electrical couplings are provided at the joined modules 3, 5. The webs 8, 9 must be aligned with each other as precisely as possible so that the functionality of the coupling is sufficiently reliable. However, this alignment can be implemented relatively easily in the above-described module combination step.

The width of the thermoplastic film web is advantageously substantially the same as the width of the first web. However, it should be noted that if the widths of the first 3 and the second module 5 are not equal in the direction perpendicular to the travel direction of the web, the width of the thermoplastic web in the direction perpendicular to the travel direction of the web is advantageously substantially equal to the width of the overlapping areas of the first 3 and the second module 5 in the finished product sensor 2. Thus, the thermoplastic film 10 is to be placed between the first 3 and the second module 5 advantageously substantially over this whole area left in between.

As to the electrical properties, the thermoplastic film may be either uniformly dielectric, or it may be at least partly electroconductive, depending on the application. To implement the coupling of FIG. 4, no electroconductive connection is needed between the first 3 and the second module 5, but the coupling is formed by means of the capacitors C1, C2. The first plate 6*a*, 6*b* of the capacitors C1, C2 is formed in the first module 3, and the second plate 7*a*, 7*b* is formed in the second module 5. Thus, when the modules 3, 5 are in their place, these different capacitor plates 6*a*, 7*a*; 6*b*, 7*b* are aligned with each other. As the thermoplastic film 10 is dielectric at least at these capacitor plates, the capacitors C1, C2 are thus formed at these locations. FIG. 2a shows a side view of the finished product sensor 2 according to an advantageous embodiment of the invention, in which the modules 3, 5 are connected to each other. In this product sensor structure, the reactive part of the measuring means is on the intermediate layer side of the modules 3, 5. This type of a product sensor structure, wherein 2 is applicable in measuring such conditions, where the direct contact of the monitored conditions to the reactive part of the measuring means is not required. Such conditions include, e.g. pressure, temperature, acceleration, and penetrant radiation. If, for example, the second module 5 is manufactured of a porous material, this type of a product sensor can also be used to measure, e.g. moisture and the presence of some gases.

FIG. 2b shows a side view of the finished product sensor 2 according to another advantageous embodiment of the invention, in which the reactive part of the measuring means is on the surface of the second module 5 and not in the intermediate layer of the modules. This type of a product sensor 2 is applicable, in addition to the properties mentioned above, in measuring such conditions, where the direct contact of the monitored conditions to the reactive part of the measuring means 13 is required. Thus, it is possible to measure also moisture, presence of gases, visible light, UV radiation, infrared radiation, etc. with the product sensor.

Hereinabove, the connection of the modules 3, 5 in a contactless manner has been described. In this way, junction resistances of the contacts are avoided. The modules 3, 5 of the product sensor 2 can also be manufactured in such a manner that a contact is formed between the modules 3, 5 to form an electrical resonance circuit.

In applications, in which an electroconductive connection is needed between the modules 3, 5, it is possible to use such a thermoplastic film, which is electroconductive or which has been formed to be electroconductive substantially in the necessary locations. Such thermoplastic films, treated to be electroconductive, are called anisotropic conductive films (ACF). Examples of such thermoplastic films to be mentioned in this context include 8773 and 8783 (Z-Axis Adhesive Films 8773 and 8783). These films are electroconductive in the thickness direction only, not in the direction of the plane. Thus, even if the thermoplastic film is placed against the surface of the module 3, 5, it will not significantly affect the internal couplings in the same module 3, 5, but only the couplings between the modules 3, 5. Even if contact junctions were needed between the modules 3, 5, the junction resistances can be made relatively low. Typically, a resistance value lower than 0.5 Ω can be achieved for a junction area of 2 mm×2 mm.

When using an electroconductive film, it is to be noted when connecting modules 3, 5 to each other that the film should not cause short circuits in the electrical coupling of the modules. This can be achieved, for example, in such a manner that the thermoplastic film 10 is coated with a dielectric material in such points which should not have any electroconductivity or in which the electroconductivity should be as low as possible.

The actual attachment of the modules 3, 5 to each other is performed by heating the thermoplastic film 10 and by applying pressure on the film, if necessary. By the effect of heat, the thermoplastic film 10 softens. After the heating, the thermoplastic film 10 is cooled, wherein the thermoplastic film 10 solidifies and forms a strong bond between the first 3 and the second module 5.

After the combination of the modules 3, 5, ready product sensors 2 have been formed, which comprise the desired electrical circuit. This electrical circuit comprises an RLC circuit. The coil L is a planar wire loop, and the capacitor C consists of two or more substantially planar plates, which is known as such.

In a manufacturing method according to another advantageous embodiment of the invention, the measuring means 13 is formed in the second module 5 preferably in the following way. The surface of the second module is provided with the necessary wirings and the capacitor plate(s) 7a, 7b, for example, by etching. At the point where the measuring means 13 is to be made, the conductor is, however, cut off. After this, an evaporation mask is pressed on the surface of the second module 5, except for the point where the measuring means 13 is to be evaporated. After this the measuring means is evaporated with, for example, silver or some other substance, which can be used in evaporation and which reacts to the desired condition. After this, the second module 5 can be provided with the other necessary layers, and the modules can be combined.

The attachment of the modules to each other can also be made in another way than by means of the thermoplastic film 10. For example, the modules 3, 5 can be glued to each other with a lamination glue with little losses, or by using extrusion lamination or an isotropic or anisotropic paste. In this case, the paste can be dispensed, for example, at the same time as the module is connected to an antenna web.

The connection can also be performed by means of a non-conducting or conductive (such as film) glue either solely or together with one or more other connection methods. Also mechanical connecting methods, whereby it is possible to access the conductive joint between metals in substantially corresponding locations in the different modules, such as crimping, embossing or ultrasonic sealing, can be applied in connection with the present invention.

Although a method has been presented above, in which the modules are manufactured as a web, it is obvious that also other methods can be applied in the manufacture of the modules 3, 5. It is, however, obvious that the measuring means 13 can also be manufactured on a separate substrate, which is connected to the coil L either capacitively or with one or two ohmic contacts, e.g. by means of extrusion lamination or a thermoplastic film (ACF).

As the measuring means 13 it is also possible to use discrete components, such as a measuring means manufactured of a semiconductor. In addition, one alternative is that the measuring means 13 is formed in connection with said RFID circuit, in which case a separate measuring means 13 is not necessary to be placed in the product sensor 2. Also, the advantage that the packing density of modules 2, 3 can be different is achieved from the module structure. For example, if the second module comprises a measuring means 13 implemented with a semiconductor component, the packing density of the second modules 5 can be significantly greater than the packing density of the first modules 3.

The data transfer between the product sensor 2 and the handling device can also be performed by means of high frequency electromagnetic fields, such as on UHF frequencies or microwaves.

Material can be selectively attached to the product sensor by means of the invention, which material must be brought to a material in the form of a web elsewhere than in manufacturing processes natural to the product sensor and especially to the coil L of the product sensor. Such materials include e.g. silver and iron, which are evaporated or printed onto their substrate. In addition, with this type of a product sensor 2, which is manufactured by attaching two modules 3, 5 together and which is suitable for measuring the condition of products, it is possible to gain material savings for the part of the measuring means 13. This is e.g. because the amount of material can be maintained very low with the addition of selective material and hardly any material is lost.

The operation of the product sensor 13 according to the present invention can be irreversible, irreversible cumulative or reversible. In the irreversible measuring means 13 a non-cumulative change in the condition is detected, in which case the measuring means 13 indicates a maximum deviation from the desired condition.

In the irreversible cumulative measuring means 13, in turn, a cumulative change takes place in the electric property of the measuring means 13, in which case the measuring means 13 indicates a temporal effect of the condition.

The product sensors based on the above-mentioned irreversible measuring means 13 do not require any memory, because the change taking place in the measuring means 13 is not reversible. If the time and/or place of the disturbance is desired to be traced, it is possible to e.g. utilize the memory of the system scanning the product sensor.

In the reversible measuring means 13, the condition change causes a reversible change in the electric property of the measuring means 13, in which case the measuring means 13 indicates a momentary deviation from the desired condition. Product sensors 2 based on reversible measuring means 13 make it possible to monitor condition history. If the sensor is a passive product sensor, the memory can be implemented in the scanner system and deviations detected in the scanning points. Also in the case of a semi-active product sensor the deviation can be detected in the scanning points. As the memory it is possible to use the memory of the scanning system and/or the memory possibly placed in the product sensor. When using active product sensors it is possible to establish the condition history independent from the scanners afterwards, in which case also momentary deviations between scanning points are possible to detect. In such product sensors the measurement can be performed; for example, while activating the product sensor, or in a timed manner. There is a memory in the product sensor where the measurement results are saved.

It is obvious that the measuring means 13 can also be composed of more than one component, in which case the electric properties of these components change when a condition changes.

It will be obvious that the present invention is not limited solely to the above-presented embodiments but it can be modified within the scope of the appended claims.

What is claimed is:

1. A method for the manufacture of a product sensor effective for use in product control, the product sensor having an antenna circuit and at least one measuring device having at least one electrical property affected by at least one condition, the method comprising:

applying a conductor on a first continuous flexible web to provide at least part of antenna circuits and form a first module web with the at least part of the antenna circuits in spaced relation along the first web;

applying measuring devices on a second flexible continuous web to provide a measuring device web and form a second module web with measuring devices in spaced relation along the second web; and bonding the first module web with the second module web to provide a product sensor web with product sensors in side by side relation, the at least part of the antenna circuits on the first web and the measuring devices on the second web, the bonded modules and configured to effect at least one of the following: (a) the first module and second bonded to each other to electrically couple the first and second module and form a resonance circuit common to both modules and (b) the second module arranged in the product sensor to electrically alter properties of an electric resonance circuit within the first module.

2. The method according to claim 1, wherein the electrical property is selected from the group consisting of electrical resistance, electrical capacitance and the first module web bonded with the second module web to electrically couple the at least part of the antenna circuits with the measuring devices, the electrical coupling selected from the group consisting of capacitive coupling and inductive coupling.

3. The method according to claim 2, wherein the electrical property of the measuring devices change, and the change in the electrical property is measured by measuring the resonance frequency of the resonance circuit.

4. The method according to claims 1 or 2, wherein the electric resonance circuit includes a coil which is in the first module web.

5. The method according to claim 4, wherein the measuring devices have an impedance and the at least one condition affects the impedance, and wherein the at least one condition has a normal status and an abnormal status, the method further including setting the impedance of the measuring devices in such a manner that in the normal status the measuring devices causes a short circuit in the antenna circuit and in the abnormal status the impedance of the measuring devices increases to remove the short circuit.

6. The method according to claim 4, wherein the resonance circuits have a quality value, the electric property of the measuring devices change and the change in the electrical property is measured by measuring the quality value.

7. The method according to claim 6, wherein the resonance circuits have a resonance frequency which changes as the electrical property changes, and the change in the electrical property is measured by measuring the resonance frequency of the resonance circuit.

8. The method according to claim 1 wherein the electrical property of the measuring device changes, and the change in the electrical property is measured by measuring the resonance frequency of the resonance circuit.

9. The method in accordance with claim 1, wherein the method further includes forming the measuring devices from a metal selected from the group consisting of silver, copper, iron and aluminum.

10. The method in accordance with claim 1, wherein the bonding of the first module web with the second module web includes bonding the first and second web with a connector selected from the group consisting of thermoplastic film, an isotropic paste, an anisotropic paste, an isotropic glue and an anisotropic glue.

11. The method according to claim 1, wherein the method further includes providing the product sensor with a memory for storing information from the measuring device about the electrical property which is related to the condition, and configuring the product sensor to measure the information about the electrical property of the measuring device and storing the information in the memory.

12. The method according to claim 11, wherein the information about the electrical property stored in the memory is compared to information about the electrical property being measured, the comparison being used to determine a change in the electrical property and condition.

13. The method according to claim 11 or 12, wherein the information stored in the memory is transferred from the product sensor by the antenna circuit.

14. The method according to claim 1, wherein the product sensor is configured to determine a characteristic curve of the measuring device in relation to a measured condition, in which case the product sensor is configured to determine a change in the measured condition by comparing the measurement result with the characteristic curve.

15. The method according to claim 1, wherein electric energy is directed to the product sensor by the antenna circuit.

16. The method according to claim 1 wherein the product sensor further includes an RFID device comprising and RFID circuit to electrically alter properties of a resonance circuit within the first module, and wherein the measuring device is configured to be in communication with the RFID device to send signals to the RFID device and the RFIF device configured to send signals responsive to the signals from the measuring device.

17. The method according to claim 16 wherein the RFID device further include memory in communication with the RFID circuit and which memory stores information.

18. A product sensor comprising:
at least one first flexible substrate;
an antenna circuit which includes at least part of a circuitry pattern on the first substrate, the at least part of the circuitry pattern and the first substrate comprising a first module;
at least one second flexible substrate;
at least one measuring device on the second substrate which has at least one electric property which is affected by at least one condition, the at least one measuring device and second substrate comprising a second module,
the product sensor including the first module and the second module bonded to each other and configured to effect at least one of the following: (a) the first module and second module bonded to each other to form a resonance circuit common to both modules and (b) the second module arranged in the product sensor to electrically alter properties of a resonance circuit within the first module.

19. The product sensor according to claim 18, wherein the measuring device includes a property selected from the group consisting of resistance and capacitance which property changes when the condition changes.

20. The product sensor according to claim 18 or 19, wherein the antenna circuit comprises the electric resonance circuit, the antenna circuit including a coil, the coil of the electrical resonance circuit being in the first module.

21. The product sensor according to claim 18 or 19, wherein the measuring device is in the electric resonance circuit.

22. The product sensor according to claim 18, wherein the measuring device includes a metal selected from the group consisting of silver, copper, iron and aluminum.

23. The product sensor according to claim 22, wherein the at least two modules are bonded to each other by a connector selected from the group consisting of thermoplastic film, an isotropic paste, an anisotropic paste, an isotropic glue and an anisotropic glue.

24. The product sensor according to claim 23, wherein the modules are configured so that the condition is measured, wherein the condition is at least one parameter selected from the group consisting of hydrogen sulphite, moisture, water, oxygen, temperature, light, ultraviolet radiation, infrared radiation, pressure and acceleration.

25. The product sensor according to claim 18, wherein the antenna circuit comprises an antenna, the antenna comprising at least one conductor formed in said first module.

26. The product sensor according to claim 18, wherein the product sensor further comprises a memory for storing information.

27. The product sensor according to claim 18, wherein one module of the product sensor includes a power supply for supplying voltage and power to the product sensor.

28. The product sensor according to claim 18 wherein the second module is arranged in the product sensor to electrically alter properties of a resonance circuit within the first module, and wherein the product sensor further includes an RFID device comprising and RFID circuit partially in the first module and partially in the second module and coupled to the resonance circuit, and the measuring device is configured to be in communication with the RFID device to send signals to the RFID device and the RFID device configured to send signals responsive to the signals from the measuring device.

29. The product sensor according to claim 28 wherein the RFID device further includes memory in communication with the RFID circuit and which memory stores information.

30. A product sensor comprising:
at least one first flexible substrate;
an antenna circuit which includes at least part of a circuitry pattern which is a conductor on the first substrate, the at least part of the circuitry pattern and the first substrate comprising a first module;
at least one second flexible substrate;
at least one measuring device on the second substrate which has at least one electric property selected from the group consisting of electrical resistance, electrical impedance, and electrical capacitance which is affected by at least one condition, the at least one measuring device and second substrate comprising a second module,
the product sensor including the first module and the second module bonded to each other with a connecting material, the bonded modules forming a resonance circuit which changes frequency when the electrical property of the measuring device changes, first module bonded with the second module to electrically couple the at least part of the antenna circuitry pattern on the first substrate with the measuring device on the second substrate, the connector material selected from the group consisting of thermoplastic film, an isotropic paste, an anisotropic paste, an isotropic glue and an anisotropic glue.

31. The product sensor according to claim 30, wherein the electrical coupling of the at least part of the antenna on the first substrate with the measuring device on the second substrate is a capacitive coupling.

32. The product sensor according to claim 30, wherein the antenna circuit includes a coil in the first module.

33. The product sensor according to claim 30, wherein the product sensor further comprises a memory which stores stored information about the electrical property stored in the memory which stored information is compared to information about the electrical property of the measuring device which changes, the comparison being used to determine a change in the electrical property and condition.

34. A method for the manufacture of a product sensor effective for use in product control, the product sensor having an antenna circuit and at least one measuring having at least one electrical property affected by at least one condition, the method comprising:
applying a conductor on a first continuous flexible web to provide at least part of antenna circuits and form a first module web with the at least part of the antenna circuits in spaced relation along the first web;

applying measuring devices on a second continuous flexible web to provide a measuring device web and form a second module web with measuring devices in spaced relation along the second web; and bonding the first module web with the second module web with a connector material selected from the group consisting of thermoplastic film, an isotropic paste, an anisotropic paste, an isotropic glue and an anisotropic glue to provide a continuous flexible product sensor web with product sensors in side by side relation, the at least part of the antenna circuits on the first web arid the measuring devices on the second web electrically coupled and configured to form electrical resonance circuits which change frequency when the electrical property of the measuring device.

35. The method according to claim 34, wherein the bonding of the first module web with the second module web provides a capacitive coupling between the first and second modules to complete the resonance circuits.

* * * * *